United States Patent Office 3,033,333
Patented May 8, 1962

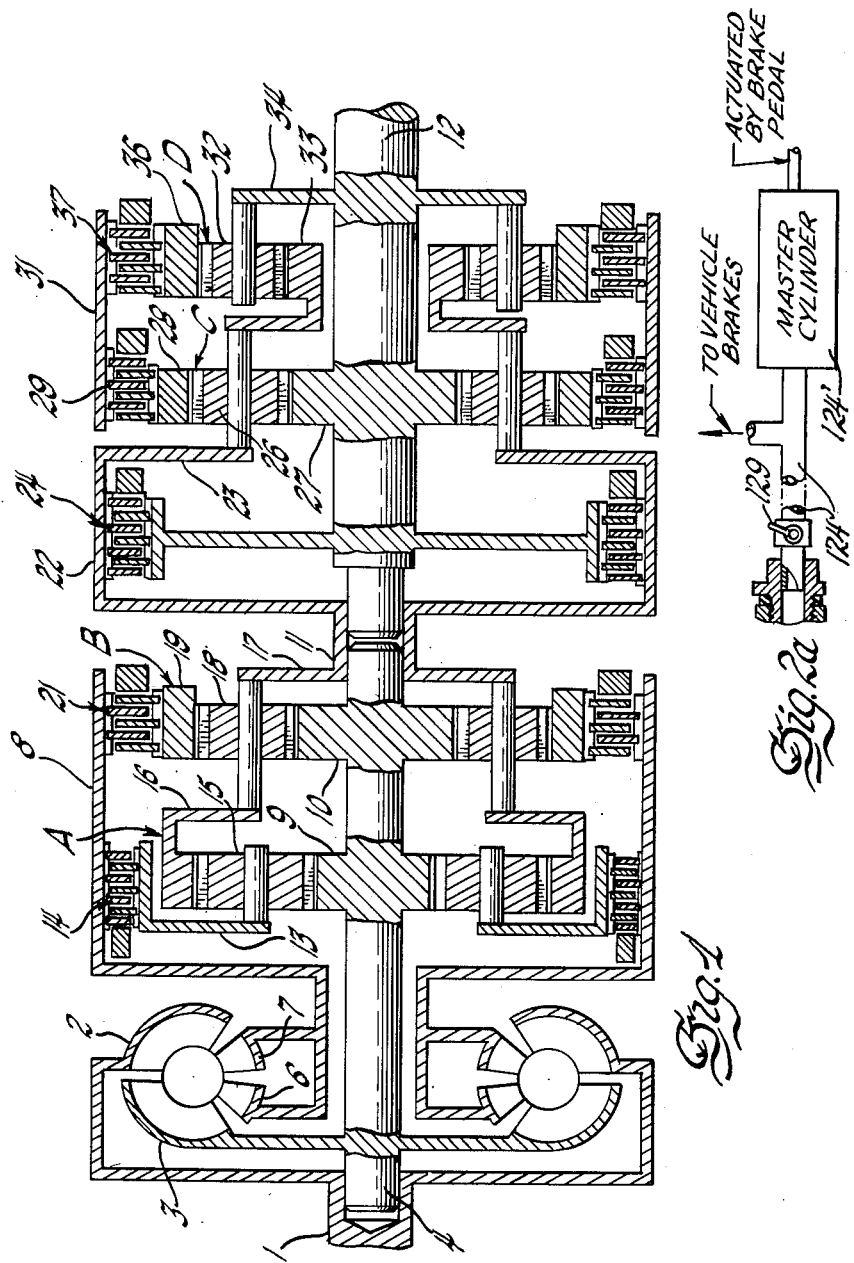

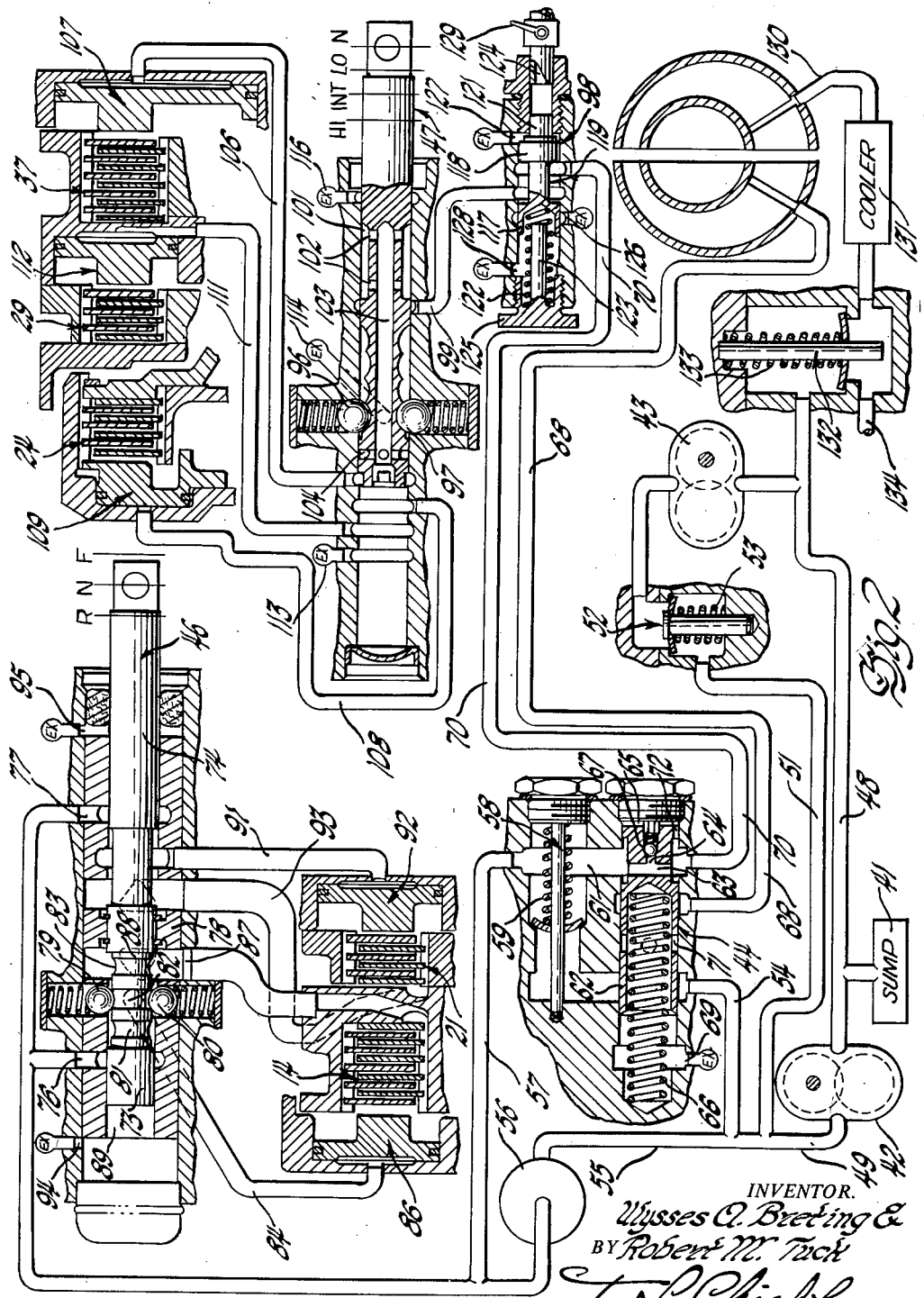

3,033,333
TRANSMISSION
Ulysses A. Breting and Robert M. Tuck, Indianapolis, Ind., assignors to General Motors Corporation, Detroit, Mich., a corporation of Delaware
Filed Dec. 5, 1955, Ser. No. 551,068
20 Claims. (Cl. 192—4)

This invention relates to variable speed transmissions, and particularly to those adapted, although not exclusively, for use in moving machinery.

It is desirable in moving machinery, e.g., lift trucks, loaders, and graders, because of the multiple operations required in lifting and moving objects, to eliminate many of the numerous manual controls. In achieving this, a suitable variable speed transmission with a minimum of manual controls is advantageous. Preferably, because the vehicle must be maneuvered backwards as well as forwards, there should also be available several reverse drive ratios in addition to the forward drive ratios. Furthermore, when moving fragile goods, especially in the case of a lift truck, the lift fork must be moved up and down smoothly to avod damaging the goods.

With these and other considerations in mind, the present invention seeks to provide a hydraulically operated transmission having a torque converter, and an improved gearing arrangement for providing three-speed ratios both in forward and reverse drive, and a simplified control system. The control system includes two pumps arranged in parallel with an improved pressure regulating means for eliminating undesired pressure fluctuations due to hunting of the regulator valve. Further, in lessening the number of manual controls, a cutoff valve is employed which will, upon application of the vehicle brakes, place the transmission in neutral.

The foregoing and other objects and advantages of the invention will be apparent from the following description and from the accompanying drawings, in which:

FIG. 1 is a schematic longitudinal section of a transmission;

FIG. 2 is a schematic hydraulic control diagram for this transmission; and

FIG. 2a is a schematic illustration of a vehicle brake control for the control system.

*General Arrangement*

Referring to FIG. 1, an input means or input shaft 1 drives a conventional torque converter having an impeller 2 connected to the shaft 1, a turbine 3 connected to a transmission drive shaft 4 and a pair of free wheeling stators 6 and 7 of known form connected to a fixed member 8. The drive shaft 4 transmits drive both to a reverse drive planetary gear set A and a forward drive planetary gear set B through a sun gear 9 and a sun gear 10, respectively. Drive is then transferred to an output sleeve 11 which is input for change speed gearing that drives an output or driven shaft 12. A reaction carrier 13 adapted to be held by a servo operated reverse brake 14, grounded to fixed member 8, rotatably mounts a plurality of pinions 15 which intermesh with the sun gear 9 and a ring gear 16. The ring gear 16 is connected to an output carrier 17 of the forward drive gear set B which carrier has rotatably mounted thereon a plurality of planet pinions 18 engaging the sun gear 10 and a reaction ring gear 19 tht is adapted to be held by a servo operated forward brake 21, also grounded to fixed member 8. When the reverse brake 14 is engaged for holding reaction carrier 13, the reverse drive gear set A will be operative to drive the ring gear 16 backwards and accordingly the output carrier 17 and sleeve 11 connected thereto in the same direction. As the carrier 17 rotates backwards, the ring 19 is permitted to rotate freely. On the other hand for forward drive, the ring gear 19 is held by brake 21 and the gear set B becomes a simple reduction unit so that drive is transferred by the sleeve 11 at a reduced speed ratio from the sun gear 10 to the output carrier 17.

The sleeve 11 drives a drum 22 which is operatively disposed to interconnect the output carrier 17 and an input carrier 23 for transmitting torque to a high speed gear set C and a low speed gear set D or, in the alternative, to transmit torque through an intermediate speed clutch 24 connected to the output shaft 12, thus by-passing gear sets C and D. The input carrier 23 for the high speed gear set C rotatably mounts a plurality of planet pinions 26 intermeshing with an output sun gear 27 and a reaction ring gear 28 adapted to held fixed by a servo operated high speed brake 29, grounded by a stationary drum 31. A sun gear 33, the input member for the low speed gear set D, is connected to the input carrier 23 and meshes with a plurality of planet pinions 32 rotatably mounted on an output carrier 34. The planet pinions 32 in turn meshingly engage a reaction ring gear 36 adapted to be held by a servo operated low speed brake 37, coacting with the stationary drum 31.

With the low speed brake 37 engaged and either the reverse brake 14 or the forward brake 21 engaged, drive will be transmitted from the input sun gear 33 through the output carrier 34 to the output shaft 12 at a reduced speed ratio, the lowest for this transmission. The intermediate speed ratio for either forward or reverse is obtained when the intermediate clutch 24 is engaged clutching the input carrier 23 for the gear set C to the output shaft 12 to provide a direct drive through gear sets C and D. In the preferred embodiment of the invention, the high speed gear set C provides an overdrive for the high speed ratio, when the high speed brake 29 is engaged. With the carrier 23 being the input and the sun gear 27 the output, the output shaft 12 will be driven at a faster speed than the carrier 23. If an overdrive is not desired, then by correlating the gear ratios of gear sets C and B, a 1 to 1 speed ratio can be obtained. The final speed ratio in each of the above cases will be affected by the speed ratio through gear set A or B, whichever is operative.

It can now be seen that three-speed ratios can be obtained from the two gear sets C and D by engaging and disengaging the clutch 24 and the brakes 29 and 37 which together with the reverse drive gear set A or forward drive gear set B provide three-speed ratios both in a forward and a reverse direction of the output shaft 12.

*Control System*

The control system in FIG. 2 includes a sump or reservoir 41 for providing a source of fluid that is pumped by either or both an input shaft driven pump 42 and an output shaft driven pump 43 at a pressure, determined by a pressure regulator valve 44, to a plurality of piston type servos that operate the clutch and brakes for the transmission and also to a torque converter. A forward and reverse selector valve 46 controls the forward brake 21 and the reverse brake 14 while a ratio or range selector valve 47 controls the low speed brake 37, the intermediate speed clutch 24 and the high speed brake 29.

Both of the parallel connected pumps 42 and 43 receive their fluid supply from the sump 41 through a passage 48 and discharge into a main supply passage 49 connected directly to the discharge side of pump 42 and to the discharge side of pump 43 through a branch passage 51 including a check valve 52. A spring 53 and the discharge pressure of pump 42 in the conduit 51 coact to hold the check valve 52 closed preventing backflow from pump 42 when the vehicle is stationary and the pump 43 is consequently inoperative. Since the pump 43 is of the positive displacement type, check valve 52 will open as soon as fluid flow starts. From main supply passage 49, pressure fluid can proceed directly to the pressure regulator valve 44 through a by-pass 54 or through a main passage 55 having any suitable filtering means 56 and then to a passage 57. A relief valve 58 separates the two passages 54 and 57 by employing a spring 59 to maintain the relief valve 58 closed preventing fluid flow from by-pass 54 into an inlet port 61 open at all times to passage 57. The relief valve 58 serves as a safeguard for the system and is usually closed except for extreme conditions, for instance, when the filtering means 56 is obstructed or with very cold fluid which would flow with difficulty through the filtering means. When these extreme conditions occur, the relief valve 58 will open and continue to supply the inlet port 61 so that there is an assurance that, generally, pressure fluid will always be available in the inlet port 61 whether supplied from by-pass 54 or passage 57.

The pressure regulator valve 44 includes a bore having a valve plunger 62 slidable therein for admitting pressure fluid through the inlet port 61, a valve passage 63 and an axial valve passage 64 to pressure regulating chamber 65 in which fluid pressure urges the valve plunger 62 to the left against the restoring force of a regulator spring 66. The coaxial passage 64 has a spring biased check valve 67 which upon a predetermined pressure build up will open and admit pressure to the rear face of the valve plunger 62. As the plunger 62 moves to the left a torque converter feed passage 68 is first opened and then the by-pass 54 starts to open to a relief port 69 through a plurality of openings 71 in the plunger 62. During the operation of the pressure regulator valve 44, the valve plunger 62 will always keep inlet port 61 and an outlet passage 70 in open communication.

The arrangement of the pressure regulator valve 44 is advantageous since pressure fluid in the regulating or dash pot chamber 65 admitted by the ball check valve 67 will prevent rapid movement of the pressure regulator valve 44 to the right upon a decrease in pressure by the dash pot or retarding effect created by the trapped fluid, the only outlet being a relief opening such as a relief or vent 72 on a land of plunger 62 which vent could, of course, be in the valve body. Furthermore, with this arrangement pressure fluid in the by-pass 54 is exhausted directly to the relief port 69 so that unfiltered fluid is exhausted and the filtered fluid in the main passage 55 is transferred through pressure regulator valve 44 to the control system.

Pressure fluid proceeds through the port of passage 55 downstream from the filtering means 56 to the forward and reverse selector valve 46 which valve and its functions have been described in detail in the application of Howard W. Christenson, William G. Livezey and Ulysses A. Breting, S.N. 509,298, filed May 18, 1955. Briefly, in this transmission the valve, which is manually operated by any suitable device (not shown), controls fluid pressure supply to the reverse brake 14 and the forward brake 21 for gear sets A and B, respectively and comprises two end valve lands 73 and 74 with land 73 controlling inlet port 76 and land 74 controlling inlet port 77, a central land 78 of larger diameter, and a positioning detent including two oppositely disposed spring biased balls 79 and 80 riding in and adapted to conform with three annular grooves 81, 82 and 83 corresponding respectively to forward, neutral and reverse positions for the valve 46. When the valve 46 is moved to the left from the position illustrated, the balls 79 and 80 engage the groove 83 and inlet port 76 will supply pressure fluid through a feed passage 84 to operate a reverse servo 86 for engaging reverse brake 14 and through a brake lubrication passage 87 to cool and lubricate the brake 14. As valve 46 progresses to the left, brake lubrication passage 87 will be closed by land 78 and because land 78 is larger than land 73, the unbalanced pressure will resist this leftward movement and such resistance will be somewhat proportional to pressure build up in the passage 84 for the reverse brake 14, thus providing the operator with a "hydraulic feel." Upon continued movement of the valve 46, a land 88 will enter the bore 89 completely shutting off pressure fluid supply to the lubrication passage 87 and eliminating the "hydraulic feel" aspect. The operation of the valve 46 in supplying pressure fluid from inlet passage 77 to feed passage 91 for actuating a forward servo 92 that engages brake 21 and for supplying lubrication oil to its lubrication passage 93 is similar to that described in operating the reverse brake 14. Any leakage of fluid that occurs around the end areas of the valve 46 will drain to a pair of exhaust ports 94 and 95.

The range or ratio selector valve 47, adapted to be maneuvered manually by any suitable means (not shown), is illustrated in the neutral position and held by a positioning detent including two opposed spring biased balls 96 and 97 received by a plurality of conforming recesses corresponding to the various speed range positions of the valve 47, namely, neutral, low, intermediate and high, the sequence of positions the valve takes as it is moved to the left. When the valve 47 is moved to the first position, low speed, pressure fluid flows from passage 70 through a cutoff valve 98, an inlet passage 99, an annular groove 101 of the valve 47, a plurality of openings 102, an axial passage 103 to a plurality of openings 104 transverse to the axial passage 103. In the low speed position the openings 104 align with a passage 106 and supply pressure fluid to actuate a low speed servo 107 for applying the low speed brake 37. In the next position of the range selecter valve 47, intermediate speed, openings 104 align with an intermediate clutch supply passage 108 to provide pressure fluid for actuating an intermediate speed servo 109 which then engages the intermediate speed clutch 24. In the next position, high speed, pressure fluid is supplied to a passage 111 for engaging by a high speed servo 112 the high speed brake 29. When valve 47 is not supplying pressure fluid through openings 104 to the servos then either a vent 113 or a vent 114 will always relief fluid pressure in the other servos. An additional vent 116 exhausts leakage from around the end of the valve 47 to the sump 41.

A cutoff valve 98, disposed between the pressure regulator valve 44 and the range selector valve 47, controls the pressure fluid supply from passage 70 to the inlet passage 99 for the range selector valve 47. The cutoff valve 98 is of the piston type having two lands 117 and 118 with an intermediate reduced portion 119 and an end reduced portion 121. The land 117 includes a bore for receiving a compression spring 122 and a guide pin 123 slidable within the spring. As illustrated, the force of the spring 122 which holds cutoff valve 98 in an open position permitting free passage of pressure fluid between passages 70 and 99 is opposed by fluid pressure in a conduit 124 acting on the end area of the reduced portion 121. After the fluid pressure in conduit 124 reaches a predetermined value, the valve 98 will move so that land 118 will interrupt communication between passages 70 and 99 and land 117 will uncover an exhaust port 126 relieving inlet passage 99. At the cutoff position, the guide pin 123 limits valve travel to that which will not permit the reduced portion 121 to vent pressure fluid in conduit 124 to an exhaust port 127, the purpose of port 127 being as well as an exhaust port 128 for the relief of the adjacent areas of leakage fluid. The source of pressure fluid in the conduit 124 is associated with the vehicle brakes' hydraulic system in a manner that, upon actuation of the brakes, pressure fluid will be admitted to the conduit 124 from a conventional brake master cylinder 124' and cause actuation of the cutoff valve 98 to the cutoff position for rendering the servos 107, 109 and 112 inoperative to establish drive through the transmission. Preferably this pressure fluid in the conduit 124 is the same fluid that is employed to actuate the vehicle brakes. It is manifest that the cutoff point will be determined by the relationship of the spring 122 to the pressure in conduit 124 and therefore the spring force may be varied, as by an adjusting plug 125, so that a partial application of the brakes will actuate the valve or if desired, a full application may be required to actuate the valve 98. Furthermore, a shutoff valve 129 of any well known type may be employed to eliminate the influence of pressure fluid in conduit 124 so that the cutoff valve 98 will only operate when desired.

The torque converter is supplied pressure fluid by the converter feed passage 68 and drains to an outlet passage 130 that includes a cooler 131 of any suitable construction, and which passage terminates at a relief valve 132 biased to the closed position by spring 133. The drainage fluid in outlet passage 130 is transferred by a lubrication passage 134 to the transmission for lubricating the working parts. When the pressure builds up to a predetermined value in lubrication passage 134, the spring 133 will be compressed and the relief valve 132 opened permitting the excess fluid to flow back into the passage 48, connected to the sump 41.

In operation, the operator first moves the forward and reverse selector valve 46 to either the forward or reverse drive position, determined by whether he wishes the vehicle to move forwards or backwards, and then by maneuvering the range selector valve 47 to any one of the three available drive positions, high, intermediate or low, he can establish a suitable speed ratio. With a lift truck as an example, when the operator applies the vehicle brakes, the cutoff valve 98 will neutralize the transmission permitting use of the power for operating the lift fork. This eliminates the necessity of moving either the range selector valve 47 or the forward or reverse selector valve 46 to neutral for interrupting drive through the transmission.

We claim:

1. In a variable speed transmission, in combination, a drive shaft; a driven shaft; forward and reverse drive planetary gear sets with each of said gear sets having input, output and reaction elements; a drive connection between said input of said elements of each of the said gear sets and said drive shaft; a drive connection between said output element of said forward drive gear set and said output element of said reverse drive gear set, said output element of said forward drive planetary gear set constituting the output for both of said gear sets; a brake to hold said reaction element of said reverse drive gear set against rotation for reverse drive of said output element of said forward drive gear set at a reduced speed relative to said drive shaft; a brake for said reaction element of said forward drive gear set to prevent backward rotation thereof for forward drive of said output element of said forward drive gear set at a reduced speed relative to said drive shaft; a high speed planetary gear set having one element thereof drive connected to said output element of said forward drive gear set, another element thereof drive connected to said driven shaft, and still another element thereof adapted to be held so as to produce an overdrive speed ratio therethrough; a clutch for locking up said high speed planetary gear set by joining together two of said high speed planetary gear set elements so as to produce a direct drive ratio therethrough; and a low speed planetary gear set having one element thereof drive connected to one of the elements of said high speed planetary gear set, another element thereof drive connected with said driven shaft, and still another element thereof adapted to be held so as to produce a low speed ratio; said clutch being so arranged as to cause said low speed planetary gear set to be also conditioned for direct drive when said high speed planetary gear set is locked up for direct drive; said forward and reverse drive gear sets combining with said low and high speed gear sets to afford three forward and three reverse speed ratios.

2. In a variable speed transmission comprising, in combination, a drive shaft; a driven shaft; forward drive and reverse drive gear sets each having a sun gear connected to said drive shaft, a ring gear, and a planet carrier having rotatably mounted planet pinions in meshing engagement with the ring and sun gears; a driving connection between the carrier of the forward drive gear set and the ring gear of the reverse drive gear set, the carrier of the forward drive gear set being an output member for the gear sets; a brake for the carrier of said reverse drive planetary gear set to produce, when engaged, reverse rotation of said output carrier at a reduced speed relative to said drive shaft; a brake for the ring gear of said forward drive gear set to produce, when engaged, forward rotation of said output carrier at a reduced speed relative to said drive shaft; a high speed planetary gear set having one element thereof drive connected to said output carrier, another element thereof drive connected to said driven shaft, and still another element thereof adapted to be held so as to produce an overdrive speed ratio therethrough; a clutch for locking up said high speed planetary gear set to produce a direct drive therethrough; and a low speed planetary gear set having one element thereof drive connected to said output carrier, another element thereof drive connected with said driven shaft, and still another element thereof adapted to be held so as to produce a low speed ratio therethrough; said clutch also causing said low speed planetary gear set to be conditioned for direct drive when said high speed planetary gear set is locked up for direct drive; said forward and reverse gear sets combining with said low and high speed gear sets to afford three forward and three reverse speed ratios.

3. In a variable speed transmission comprising, in combination, a drive shaft; a driven shaft; forward drive and reverse drive gear sets each having a sun gear connected to said drive shaft, a ring gear, and a planet carrier having rotatably mounted planet pinions in meshing engagement with said ring and sun gears; a drive connection between the carrier of the forward drive gear set and the ring gear of the reverse drive gear set, the carrier of the forward drive gear set being an output member for the gear sets; a brake for the carrier of said reverse drive planetary gear set to produce, when engaged, reverse rotation of said output carrier at a reduced speed relative to said drive shaft; a brake for the ring gear of said forward drive gear set to produce, when engaged, forward rotation of said output carrier at a reduced speed relative to said drive shaft; a high speed planetary gear set including an input element drive connected to said output carrier, an output element drive connected to said driven shaft, and a reaction element adapted to be held so as to produce an overdrive speed ratio through said high speed planetary gear set; a clutch for locking up said high speed planetary gear set by joining together said high speed planetary gear set input and output elements so as to produce a direct drive through said high speed planetary gear set; and a low speed planetary gear set including an input element drive connected to said high speed planetary gear set input element, an output element drive connected to said driven shaft, and a reaction element adapted to be held so as to produce a reduced speed ratio through said low speed planetary gear set; said clutch being so arranged as to cause said low speed planetary gear set to be also conditioned for direct drive when said high speed planetary gear set is locked up for direct drive; said forward and reverse drive gear sets combining with said low and high speed gear sets to afford three forward and three reverse speed ratios.

4. In a planetary gear transmission; in combination, a driving means; a driven means; a first planetary gear set including an input carrier connected to said driving means and having a plurality of planet pinions mounted thereon, an output sun gear connected to the driven means, and a reaction ring gear adapted to be held against rotation, said ring gear and sun gear engaging said planet pinions; a second planetary gear set including an input sun gear connected to said input carrier for said first planetary gear set, a reaction ring gear adapted to be held against rotation, and an output carrier connected to said driven means and having a plurality of pinions mounted thereon engaging said last mentioned ring and sun gears, friction devices alternately engageable to hold said reaction ring gears and provide a plurality of speed ratios; and clutch means for locking together both said input carrier and said output sun gear of said first planetary gear set to provide a direct drive through said first planetary gear set.

5. A variable speed transmission for a motor vehicle having brakes comprising, in combination, a drive shaft, a driven shaft, a plurality of planetary gear sets having drive sustaining elements and operatively disposed between said drive and driven shafts, said planetary gear sets including forward and reverse gear sets adapted to drive said driven shaft in a plurality of speeds both in forward and reverse directions, a plurality of friction devices selectively operative to engage said drive sustaining elements to cause said plurality of gear sets to vary speed ratios, a plurality of pressure fluid operated means for operating said plurality of friction devices, a selector valve for controlling the supply of pressure fluid to said pressure operated means, pump means for supplying pressure fluid to said pressure fluid operated means, a pressure regulator valve for controlling the pressure of fluid supplied by said pump means so as to afford a relatively constant pressure, a control valve operative for cutting off pressure fluid supply to said pressure fluid operated means for said friction devices thus neutralizing said transmission, an actuating means for said control valve, said actuating means being operated by said vehicle brakes so that when said vehicle brakes are applied said actuating means will cause said control valve to be operative thereby cutting off the pressure fluid supply to said pressure fluid operated means, and means for preventing said control valve from being operated by said actuating means.

6. In a variable speed transmission for a motor vehicle having brakes comprising, in combination, a drive shaft, a driven shaft, a plurality of planetary gear sets having drive sustaining elements and operatively disposed between said drive shaft and said driven shaft, said planetary gear sets including forward and reverse gear sets and adapted to drive said driven shaft in a plurality of speeds both in a forward and a reverse direction, a plurality of friction devices selectively operative to engage said drive sustaining elements and cause said plurality of gear sets to vary speed ratios, a plurality of pressure fluid operated means for operating said plurality of friction devices, a manually operated selector valve controlling the supply of pressure fluid to said pressure operated means, pump means for supplying pressure fluid to said pressure fluid operated means, a pressure regulator valve for controlling the pressure of fluid supplied by said pump means so as to afford a relatively constant pressure, a control valve operative for cutting off pressure fluid supplied to said pressure fluid operated means for said friction devices thus neutralizing said transmission, actuating means for said control valve dependent on operation of said vehicle brakes so that when said brakes are applied said actuating means will move said control valve to the cutoff position, and means for preventing said actuating means from moving said control valve to the cut-off position.

7. A variable speed transmission comprising, in combination, a drive shaft, a driven shaft, forward and reverse planetary gear sets including reaction control elements, an input member connected to said drive shaft, and an output member for said forward and reverse planetary gear sets, a plurality of planetary gear sets having drive sustaining elements and connected between the output member for said forward and reverse planetary gear sets and said driven shaft, said planetary gear sets adapted to coact for driving said driven shaft in a plurality of speeds both in the forward and reverse directions, a pair of brakes for selectively holding said reaction control elements of said forward and reverse gear sets to drive said output member in a forward or a reverse direction, a plurality of friction devices selectively operative to engage said drive sustaining elements of said plurality of planetary gear sets for effecting speed ratio changes, pressure fluid operated means for operating said pair of brakes and including forward and reverse selector valve for selectively controlling pressure fluid supply thereto, pressure fluid operated means for operating said plurality of friction devices, a ratio selector valve for selectively controlling pressure fluid supply to said pressure fluid operated means for a source of fluid under pressure for operating said pressure fluid operated means for said brakes and said friction devices, a control valve operative for cutting off pressure fluid supplied to said pressure fluid operated means for said friction devices thus neutralizing said transmission, and an actuating means for said control valve.

8. A variable speed transmission for a motor vehicle having brakes, in combination, a drive shaft, a driven shaft, forward and reverse planetary gear sets including reaction control elements, and an input member common to said forward and reverse planetary gear sets connected to said drive shaft, and an output member for said forward and reverse planetary gear sets, a plurality of planetary gear sets having drive sustaining elements and connected between the output member for said forward and reverse planetary gear sets and said driven shaft, a pair of brakes for selectively holding said reaction control elements of said forward and reverse gear sets to drive said output member in a forward and reverse direction, a plurality of friction devices selectively operative to engage said drive sustaining elements of said plurality of planetary gear sets for effecting speed ratio changes, said planetary gear sets adapted to coact for driving said driven shaft in a plurality of speeds both in forward and reverse directions, pressure fluid operated means for operating said pair of brakes, a forward and reverse selector valve for selectively controlling pressure fluid to said pressure fluid operated means for said brakes, pressure fluid operated means for operating said plurality of friction devices, a ratio selector valve for selectively controlling pressure fluid supply to said pressure fluid operated means for said friction devices, a source of fluid under pressure for operating said pressure fluid operated means for said brakes and said friction devices, a control valve operative for cutting off pressure fluid supply to said pressure fluid operated means for said friction devices thus neutralizing said transmission, actuating means for said control valve dependent on operation of said vehicle brakes so that when said vehicle brakes are applied said actuating means will move said control valve to the cutoff position, and means for preventing operation of said control valve when operating said vehicle brakes.

9. A control system for a variable speed transmission comprising, in combination, a source of fluid under pressure, variable speed ratio establishing means including a plurality of pressure operated means for establishing a plurality of speed ratios through said transmission in both forward and reverse drive, direction establishing means including pressure operated forward and reverse drive establishing devices for said variable speed ratio establishing means, a forward and reverse selector valve interconnecting said source of fluid under pressure and said forward and reverse drive establishing devices for selectively controlling the supply of pressure fluid to said forward and reverse drive establishing devices, a ratio selector valve operatively disposed between said source and said plurality of pressure operated means to control the supply of pressure fluid for rendering said pressure operated means selectively operative and thereby afford a plurality of drive ratios in both forward and reverse drive, a cutoff valve connected between said source and said plurality of pressure operated means for cutting off the supply of pressure fluid to said pressure operated means thus neutralizing said transmission, actuating means for said cut-off valve, and disabling means rendering said actuating means incapable of causing said cut-off valve to cut off the supply of pressure fluid to said pressure operated means.

10. A control system for a variable speed transmission for a motor vehicle having brakes comprising, in combination, a source of fluid under pressure, variable speed ratio establishing means including a plurality of pressure operated means for establishing a plurality of speed ratios through said transmission in both forward and reverse drive, direction establishing means including pressure operated forward and reverse drive establishing devices for said variable speed ratio establishing means including a forward and reverse selector valve interconnecting said source of fluid under pressure and said forward and reverse drive establishing devices for selectively controlling the supply of pressure fluid supplied to said forward and reverse drive establishing devices, a ratio selector valve operatively disposed between said source and said plurality of pressure operated means to control the supply of pressure fluid for rendering said pressure operated means selectively operative and thereby afford a plurality of drive ratios in both forward and reverse drive, a cutoff valve connected between said source and said plurality of pressure operated means, an operative connection between said cutoff valve and said vehicle brakes for moving said cutoff valve to a closed position for cutting off the supply of pressure fluid to said pressure operated means when said vehicle brakes are applied, and disabling means rendering said operative connection incapable of moving said cut-off valve to the closed position.

11. In a control system for a motor vehicle including brakes and a variable speed transmission having an input member and an output member, the combination of a pump driven by said input member, a pump driven by said output member and in parallel with said input driven pump, a discharge passage common to both of said pumps, a check valve to prevent flow of pressure fluid from said input driven pump to said output driven pump, variable speed ratio establishing means including a plurality of pressure operated means for establishing a plurality of speed ratios through said transmission in both forward and reverse drive, direction establishing means including pressure operated forward and reverse drive establishing devices for said variable speed ratio establishing means, a forward and reverse selector valve interconnecting said discharge passage and said forward and reverse drive establishing devices for selectively controlling the supply of pressure fluid to said forward and reverse drive establishing devices, a ratio selector valve operatively disposed between said discharge passage and said plurality of pressure operated means to control the supply of pressure fluid for rendering said means selectively operative and thereby afford a plurality of drive ratios in both forward and reverse drive and a cutoff valve connected between said discharge passage and said plurality of pressure operated means, and an operative connection between said cut-off valve and said vehicle brakes for moving said cut-off valve to a closed position so as to cut off the supply of pressure fluid to said pressure operated means thus neutralizing said transmission when the vehicle brakes are applied.

12. A control system for a variable speed transmission comprising, in combination, a source of fluid under pressure, pressure regulating means for regulating the fluid pressure from said source so as to maintain a substantially constant pressure in said system, variable speed ratio drive establishing means including a plurality of pressure operated means for establishing a plurality of speed ratios through said transmission in both forward and reverse drive, direction establishing means including pressure operated forward and reverse drive establishing devices for said transmission, a forward and reverse selector valve interconnecting said source of fluid under pressure and said forward and reverse drive establishing devices for selectively controlling the supply of pressure fluid to said forward and reverse drive establishing devices, a ratio selector valve operatively disposed between said source and said plurality of pressure operated means to control the supply of pressure fluid for rendering said pressure operated means selectively operative and thereby afford a plurality of drive ratios in both forward and reverse drive, a cutoff valve connected between said source and said plurality of pressure operated means for cutting off the supply of pressure fluid to said pressure operated means thus neutralizing said transmission, means for filtering fluid in said system and a by-pass valve for, at predetermined pressures, by-passing fluid around said filtering means, said pressure regulating means being so arranged relative to said filtering means that unfiltered fluid is relieved thereby when regulating the filtered fluid.

13. A control system for a variable speed transmission for a motor vehicle having brakes comprising, in combination, a pump means, a pressure regulating valve connected to the output of said pump means and adapted to maintain a substantially constant pressure in said system, and fluid pressure operated retarding means for said pressure regulator valve operative to prevent excessive fluctuations of said pressure regulator valve when the pressure in said system is decreased, variable speed ratio drive establishing means including a plurality of pressure operated means for establishing a plurality of speed ratios through said transmission, direction establishing means including pressure operated forward and reverse drive establishing devices for said variable speed ratio drive establishing means, a forward and reverse selector valve interconnecting said pump means and said forward and reverse drive establishing devices for selectively controlling pressure supplied to said forward and reverse drive establishing devices, a ratio selector valve operatively disposed between said pump means and said plurality of pressure operated means to control pressure supply for rendering said pressure operated means selectively operative, a cutoff valve connected between said pump means and said plurality of pressure operated means for in a cut-off position interrupting pressure supply to said pressure operated means so as to neutralize said transmission, and actuating means for moving said cut-off valve to the cut-off position when the vehicle brakes are applied.

14. A motor vehicle including brakes and a transmission comprising, in combination, a fluid pressure actuating means for the vehicle brakes, pressure operated means operative to establish drive at selected speed ratios through the transmission, pump means for rendering said pressure operated means operative, a control valve disposed between said pump means and said pressure operated means for controlling the supply of pressure fluid to said pressure operated means, said valve having an operative connection with said fluid actuating means so that when the brakes are applied said fluid actuating means will move said valve to a closed position cutting off pressure supplied to said pressure operated means, and a disabling means for preventing said fluid actuating means from operating said control valve.

15. A motor vehicle including brakes and a transmission comprising, in combination, means for actuating the vehicle brakes for stopping the motor vehicle, pressure operated means operative to establish drive at selected speed ratios through the transmission, pump means for rendering said pressure operated means operative, a control valve disposed between said pump means and said pressure operated means for controlling the supply of pressure fluid to said pressure operated means, said valve having an operative connection with said actuating means such that when said vehicle brakes are applied said actuating means will move said control valve to a closed position for cutting off pressure fluid supply to said pressure operated means, and adjustable means for variably opposing the movement to the closed position of said control valve.

16. A motor vehicle including brakes and a transmission comprising, in combination, fluid pressure actuating means for the vehicle brakes, pressure operated means operative to establish drive at selected speed ratios through the transmission, pump means for rendering said pressure operated means operative, a control valve disposed between said pump means and said pressure operated means for controlling the supply of pressure fluid to said pressure operated means, said valve having an operative connection with said fluid actuating means so that when the brakes are applied said fluid actuating means will move said valve to a closed position cutting off pressure supplied to said pressure operated means, a disabling means for preventing said fluid actuating means from operating said control valve, and adjustable means for variably opposing the movement of said control valve to the closed position.

17. A motor vehicle including brakes and a transmission comprising, in combination, fluid pressure actuating means for said vehicle brakes; a source of brake fluid under pressure for operating said actuating means; pressure operated means operative to establish drive at selected speed ratios through the transmission; pump means for rendering said pressure operated means operative; a cutoff device for interrupting fluid flow from said pump means to said pressure operated means, said cutoff valve device including a valve body having a bore therein, an inlet port connected to said pump means, an outlet port connected to said pressure operated means, a relief port, a valve plunger slidable in said bore and adapted in an open position to permit fluid flow between said inlet and outlet ports and in a closed position to both interrupt communication between said inlet and outlet ports and to open said outlet port to said relief port for relieving fluid pressure in said outlet port; a biasing means for urging said valve plunger to the open position; and pressure responsive means connected to said fluid pressure brake actuating means for moving said valve plunger to the closed position when the vehicle brakes are applied.

18. A motor vehicle including brakes and a transmission comprising, in combination, fluid pressure actuating means for said vehicle brakes; a source of brake fluid under pressure for operating said actuating means; pressure operated means operative to establish drive at selected speed ratios through the transmission; pump means for rendering said pressure operated means operative; a cutoff device for interrupting fluid flow from said pump means to said pressure operated means, said cutoff valve device including a valve body having a bore therein, an inlet port connected to said pump means, an outlet port connected to said pressure operated means, a relief port, a valve plunger slidable in said bore and adapted in an open position to permit fluid flow between said inlet and outlet ports and in a closed position both to interrupt communication between said inlet and outlet ports and to open said outlet port to said relief port for relieving fluid pressure in said outlet port; a biasing means for urging said valve plunger to the open position; and pressure responsive means connected to said fluid pressure brake actuating means for moving said valve plunger to the closed position when the vehicle brakes are applied; a shutoff valve operable for rendering said pressure responsive means inoperative to move said valve plunger; and adjustable means for said biasing means to vary the force urging said valve plunger to the open position.

19. A control system for a variable speed transmission for a motor vehicle having brakes comprising, in combination, a pump means, filtering means associated with said pump means, a pressure regulating valve connected to the output of said pump means and adapted to control pressure in said system by relieving unfiltered pressure fluid during regulation and supplying filtered regulated pressure fluid to the system, variable speed ratio drive establishing means including a plurality of pressure operated means for establishing a plurality of speed ratios through said transmission, direction establishing means including pressure operated forward and reverse drive establishing devices for said variable speed ratio drive establishing means, a forward and reverse selector valve interconnecting said pump means and said forward and reverse drive establishing devices for selectively controlling pressure supplied to said forward and reverse drive establishing devices, a ratio selector valve operatively disposed between said pump means and said plurality of pressure operated means to control pressure supply for rendering said pressure operated means selectively operative, a cut-off valve connected between said pump means and said plurality of pressure operated means, and an operative connection between said cut-off valve and said vehicle brakes for moving said cut-off valve to a closed position so as to cut off supply of pressure fluid to said pressure operated means for neutralizing drive through said transmission when the vehicle brakes are applied.

20. A tractor control comprising, in combination, a tractor vehicle having brakes, hydraulic means to supply fluid pressure to the brakes to engage them, a transmission shiftable to neutral and to different driving ratios, hydraulic means including a supply connection and a selector valve to control the transmission, the transmission being in neutral when there is no fluid supplied thereto through the supply connection and selector valve, a pressure operated shut off valve in the supply connection, a connection from the first named hydraulic means to the shut off valve to close the shut off valve when the brakes are applied, and a selector valve in the last named connection to make the shut off valve effective or ineffective.

References Cited in the file of this patent

UNITED STATES PATENTS

| | | |
|---|---|---|
| 764,896 | Maxim | July 12, 1904 |
| 899,396 | Harthan | Sept. 22, 1908 |
| 1,979,488 | Perez | Nov. 6, 1934 |
| 2,103,540 | Livermore | Dec. 28, 1937 |
| 2,120,104 | Livermore | June 7, 1938 |
| 2,120,733 | Cotal | June 14, 1938 |
| 2,123,770 | Cotal | July 12, 1938 |
| 2,223,716 | Bojesen | Dec. 3, 1940 |
| 2,418,378 | Voytech | Apr. 1, 1947 |
| 2,516,203 | Greenlee | July 23, 1950 |
| 2,518,825 | Simpson | Aug. 15, 1950 |
| 2,548,160 | Hunter | Apr. 10, 1951 |
| 2,639,783 | Kovacs | May 26, 1953 |
| 2,653,690 | Saracchi | Sept. 29, 1953 |
| 2,668,609 | Dixon | Feb. 9, 1954 |
| 2,684,079 | Krohm | July 20, 1954 |
| 2,693,813 | Tucker | Nov. 9, 1954 |
| 2,711,656 | Smirl | June 28, 1955 |
| 2,725,763 | Stoeckicht | Dec. 6, 1955 |
| 2,770,148 | Wayman | Nov. 13, 1956 |
| 2,770,151 | Cartwright | Nov. 13, 1956 |
| 2,775,144 | Kelbel | Dec. 25, 1956 |
| 2,780,944 | Ondeck | Feb. 12, 1957 |

FOREIGN PATENTS

| | | |
|---|---|---|
| 532,844 | Germany | Sept. 4, 1931 |